US007533352B2

(12) United States Patent
Chew et al.

(10) Patent No.: US 7,533,352 B2
(45) Date of Patent: May 12, 2009

(54) METHOD AND APPARATUS FOR PROVIDING CONTEXT MENUS ON A HAND-HELD DEVICE

(75) Inventors: Chee H. Chew, Redmond, WA (US); Elizabeth A. Bastiaanse, Cambridge, MA (US); Jeffrey R. Blum, Seattle, WA (US); Greg A. Keyser, Sammamish, WA (US); Charlton E. Lui, Redmond, WA (US); Kathryn L. Parker, Fall City, WA (US); Timothy D. Sharpe, Redmond, WA (US); Sarah E. Zuberec, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 937 days.

(21) Appl. No.: 10/684,769

(22) Filed: Oct. 14, 2003

(65) Prior Publication Data

US 2004/0075695 A1 Apr. 22, 2004

Related U.S. Application Data

(62) Division of application No. 09/559,694, filed on Apr. 27, 2000, now Pat. No. 6,664,991.

(51) Int. Cl.
*G06F 3/048* (2006.01)
(52) U.S. Cl. ........................... 715/781; 715/803
(58) Field of Classification Search ................ 715/808, 715/817, 845, 841, 829, 864, 708, 863, 810, 715/803
See application file for complete search history.

(56) References Cited

U.S. PATENT DOCUMENTS 5,347,295 A    9/1994   Agulnick et al. ............ 145/156
5,664,133 A *  9/1997   Malamud et al. ............ 715/816
5,666,502 A    9/1997   Capps ........................ 345/811
5,760,773 A *  6/1998   Berman et al. .............. 715/808
5,784,583 A *  7/1998   Redpath ...................... 715/841
5,805,167 A    9/1998   van Cruyningen .......... 345/808
5,825,353 A * 10/1998   Will ........................... 345/184
5,828,376 A   10/1998   Solimene et al. ............ 345/821
5,854,629 A * 12/1998   Redpath ...................... 715/830
5,856,827 A *  1/1999   Sudo .......................... 715/841
5,905,497 A *  5/1999   Vaughan et al. ............. 345/672

(Continued)

OTHER PUBLICATIONS

Chew, Chee H. et al., "User Interface for Palm-Sized Computing Device and Method and Apparatus for Displaying the Same," U.S. Appl. No. 09/564,928.

(Continued)

*Primary Examiner*—Stephen Hong
*Assistant Examiner*—Samir Termanini
(74) *Attorney, Agent, or Firm*—Theodore M. Magee; Westman, Champlin & Kelly, P.A.

(57) ABSTRACT

A user interface for a hand-held device is provided that allows users to activate the full "card" for an entry using one gesture on a button while also giving the user the ability to reach a menu of context dependent commands using a second gesture on a button. In particular, certain button inputs are recognized as context menu gestures. When these gestures are made, a context menu appears. The user is then able to select a command in the context menu that is to be performed. A user is also allowed to open context menus while only using one hand to operate and hold the device.

5 Claims, 13 Drawing Sheets

U.S. PATENT DOCUMENTS

| | | | | |
|---|---|---|---|---|
| 5,920,313 | A * | 7/1999 | Diedrichsen et al. | 715/767 |
| 6,094,197 | A | 7/2000 | Buxton et al. | 345/863 |
| 6,104,399 | A * | 8/2000 | Volkel | 715/841 |
| 6,297,795 | B1 * | 10/2001 | Kato et al. | 345/684 |
| 6,392,640 | B1 * | 5/2002 | Will | 345/184 |
| 6,424,357 | B1 * | 7/2002 | Frulla et al. | 715/728 |
| 6,445,400 | B1 * | 9/2002 | Maddalozzo et al. | 715/803 |
| 6,557,004 | B1 | 4/2003 | Ben-Schachar et al. | 707/102 |
| 6,593,949 | B1 | 7/2003 | Chew et al. | 345/841 |
| 6,911,969 | B1 * | 6/2005 | Nelson et al. | 345/163 |

OTHER PUBLICATIONS

Blum, Jeffrey, R. et al., "Method and Apparatus for Providing Recent Categories on a Hand-Held Device," U.S. Appl. No. 09/559,695.

Collection of Office Actions for U.S. Appl. No. 09/559,694.

Chew, Chee H. et al., "Method and Apparatus for Providing Context Menus on a Pen-Based Device," U.S. Appl. No. 09/559,694.

* cited by examiner

METHOD AND APPARATUS FOR PROVIDING CONTEXT MENUS ON A HAND-HELD DEVICE

REFERENCE TO RELATED APPLICATIONS

The present application is a divisional of U.S. patent application Ser. No. 09/559,694, filed Apr. 27, 2000, entitled METHOD AND APPARATUS FOR PROVIDING CONTEXT MENUS ON A PEN-BASED DEVICE, which claimed the benefit of a U.S. Provisional application having Ser. No. 60/175,110, filed on Jan. 6, 2000 and entitled METHOD AND APPARATUS FOR PROVIDING CONTEXT MENUS ON A PEN-BASED DEVICE.

BACKGROUND OF THE INVENTION

The present invention relates to hand-held computing devices. In particular, the present invention relates to user interfaces on hand-held computing devices.

In early models of hand-held devices, an entry in a list could be highlighted by tapping on it once and its "card" or full window could be opened by tapping on the entry twice. After single tapping on the entry, an action, such as delete, cut, or copy, could be invoked on the entry by making a selection from a menu located at the top of the screen.

Since users often want to access the full card of an entry when they are working with the entry and double-tapping can be a difficult operation to perform especially when the user is moving, some newer models of hand-held devices display the entry's "card" or full window when the user single taps the entry. Because of this, when a user wants to perform an action on an entry, such as Delete, the entire card must be opened before the command can be selected from a menu. For often-repeated actions such as deleting mail entries, this is cumbersome.

In addition, because the menus in the prior art are opened using a separate tap of the stylus, it is impossible to invoke menu commands on the hand-held device unless both of the user's hands are engaged in operating the device. If one of the user's hands is otherwise engaged, for example holding a briefcase, the user cannot invoke menu commands for a displayed object.

SUMMARY OF THE INVENTION

The present invention provides a user interface for a hand-held device that allows users to activate the full "card" for an entry using one gesture on a button while also giving the user the ability to reach a menu of context dependent commands using a second gesture on a button. In particular, the present invention recognizes certain button inputs as context menu gestures. When these gestures are made, a context menu appears. The user is then able to select a command in the context menu that is to be performed. The present invention also allows a user to open context menus while only using one hand to operate and hold the device.

DETAILED DESCRIPTION OF ILLUSTRATIVE EMBODIMENTS

Figure 1:
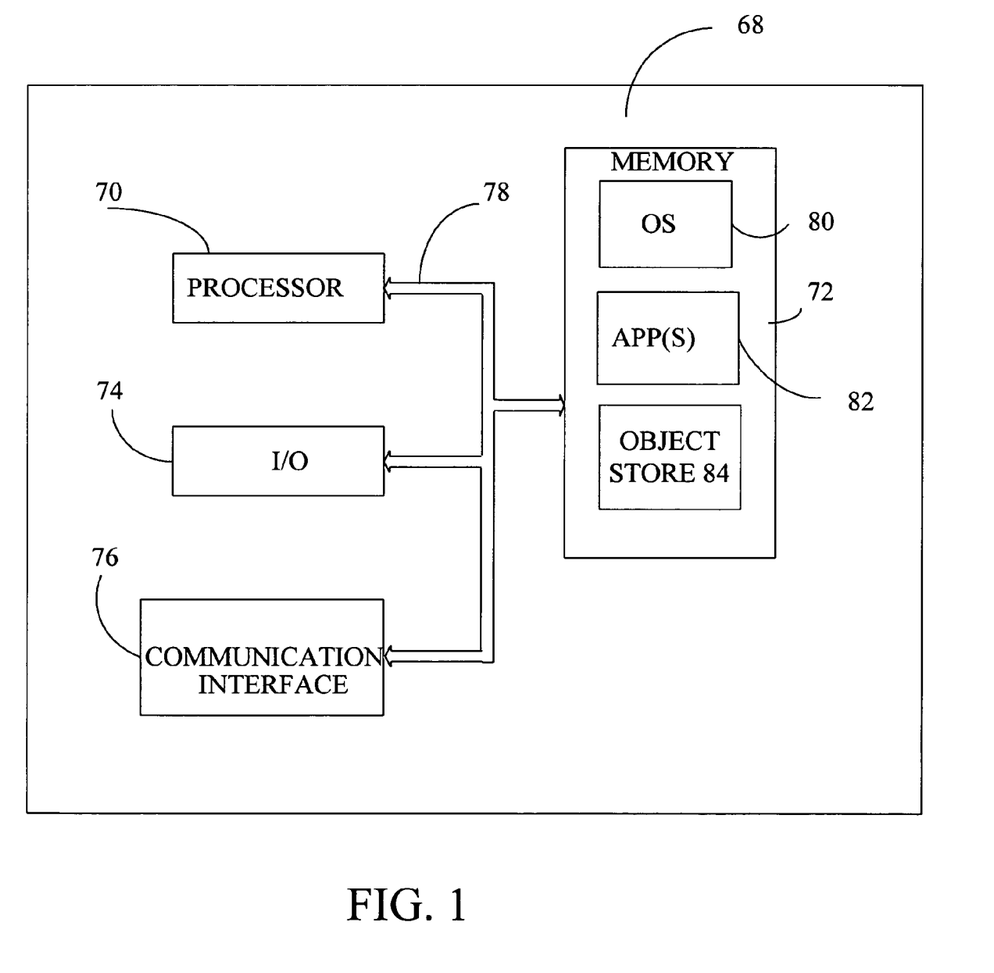
FIG. 1 is a block diagram of a mobile computing environment in which many embodiments of the present invention may be practiced.

FIG. 1 is a block diagram of a mobile device 68, which is an exemplary computing environment. Mobile device 68 includes a microprocessor 70, memory 72, input/output (I/O) components 74, a communication interface 76 for communicating with, for example, a remote computer. In one embodiment, the afore-mentioned components are coupled for communication with one another over a suitable bus 78.

Memory 72 is implemented as non-volatile electronic memory such as random access memory (RAM) with a battery back-up module (not shown) such that information stored in memory 72 is not lost when the general power to mobile device 68 is shut down. A portion of memory 72 is preferably allocated as addressable memory for program execution, while another portion of memory 72 is preferably used for storage, such as to simulate storage on a disk drive.

Memory 72 includes an operating system 80, application programs 82 as well as an object store 84. During operation, operating system 80 is preferably executed by processor 70 from memory 72. Operating system 80, in one preferred embodiment, is a "WINDOWS CE" brand operating system commercially available from Microsoft Corporation. Operating system 80 is preferably designed for mobile devices, and implements database features that can be utilized by applications 82 through a set of exposed application programming interfaces and methods. The objects in object store 84 are maintained by applications 82 and operating system 80, at least partially in response to calls to the exposed application programming interfaces and methods.

Communication interface 76 represents numerous devices and technologies that allow mobile device 68 to send and receive information. The devices include wired and wireless modems, satellite receivers and broadcast tuners to name a few. Mobile device 68 can also be directly connected to a computer to exchange data therewith. In such cases, communication interface 76 can be an infrared transceiver or a serial or parallel communication connection, all of which are capable of transmitting streaming information.

Figure 2:
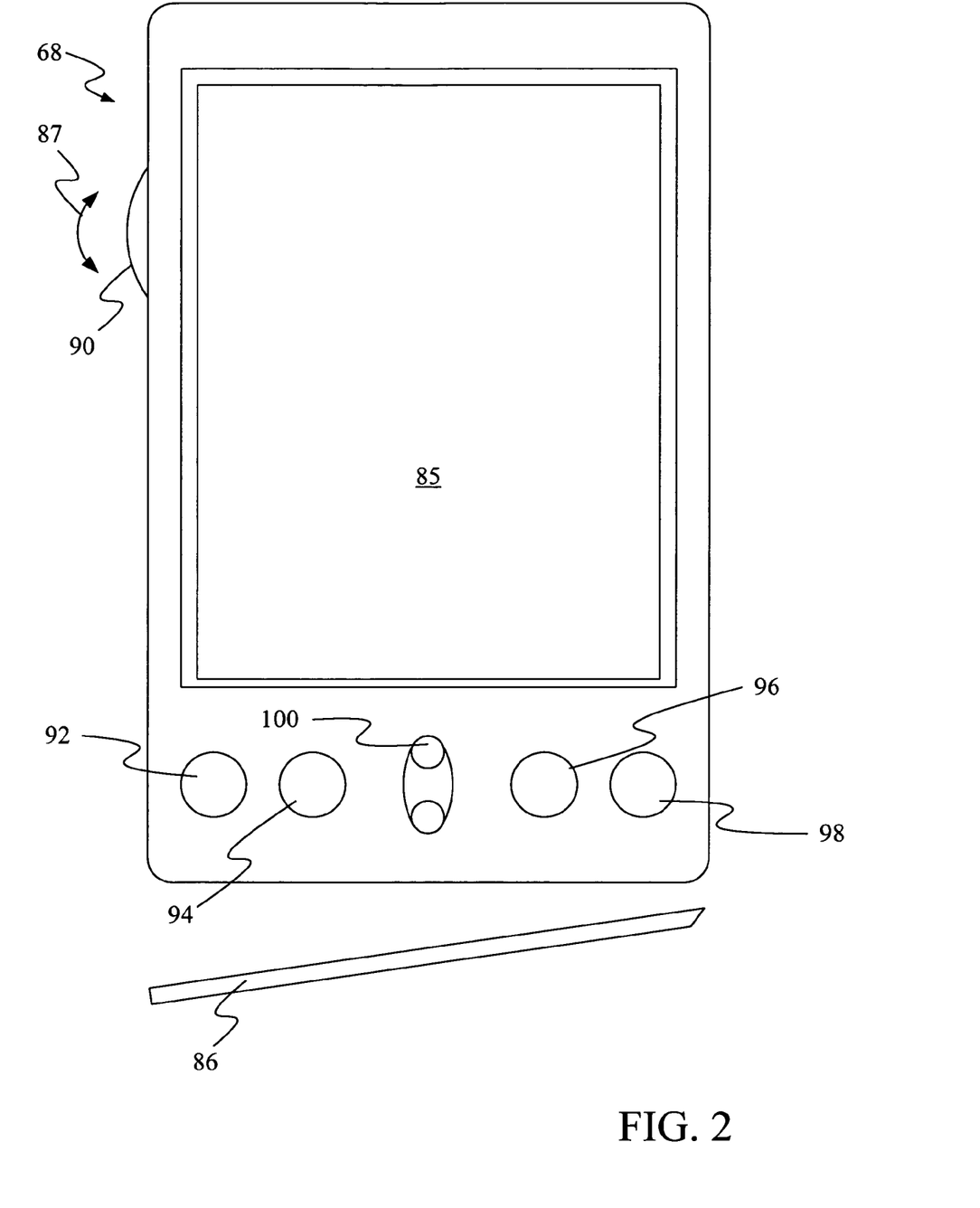
FIG. 2 is a front view of a mobile computing device on which many embodiments of the present invention may be practiced.

FIG. 2 is a simplified pictorial illustration of mobile device 68. Mobile device 68 can be a desktop assistant sold under the designation H/PC or a pocket PC designated as P/PC having software provided by the Microsoft Corporation, for example. In one embodiment, mobile device 68 includes a set of application buttons 92, 94, 96, and 98, a power button 100, a display 85 and stylus 86. In the embodiment shown in FIG. 2, display 85 is a liquid crystal display (LCD) which uses a contact sensitive display screen in conjunction with stylus 86. Stylus 86 is used to press or contact display 85 at designated coordinates to accomplish certain user input functions.

In some embodiments, a miniaturized keyboard with alpha-numeric keys is provided with the mobile device. In other known embodiments, a "soft" keyboard is provided through the contact sensitive display screen. In yet other embodiments, a character recognition module is employed to recognize characters written on the contact sensitive display screen using stylus 86.

Mobile device 68 also includes an action button 90 located on the side of the device. Action button 90 may be rotated as shown by arrows 87 to change which entry is highlighted on display 85. Action button 90 may also be depressed as discussed further below.

The present invention provides a means for identifying gestures made by the user that are intended to cause a hand-held pen-based device to display a context menu. In response to an identified gesture, the present invention notifies a parent application that the gesture occurred, thereby allowing the parent application to display a context menu if it wants to. If the parent application does not wish to display a context menu, the gesture is ignored and normal processing continues. In some embodiments, the parent application substitutes a tool tip or pop-up help for the context menu.

The contents of the context menu are left to the parent application. Usually, however, the context menu will display commands that are specifically relevant to an area of the screen that has been highlighted or that contains the cursor or carat. Once the context menu is displayed, the user may select one of the entries using the stylus or an external up/down control. The user can dismiss the context menu without making a selection. Under one embodiment, this is done by touching the stylus outside of the context menu.

Figure 3:
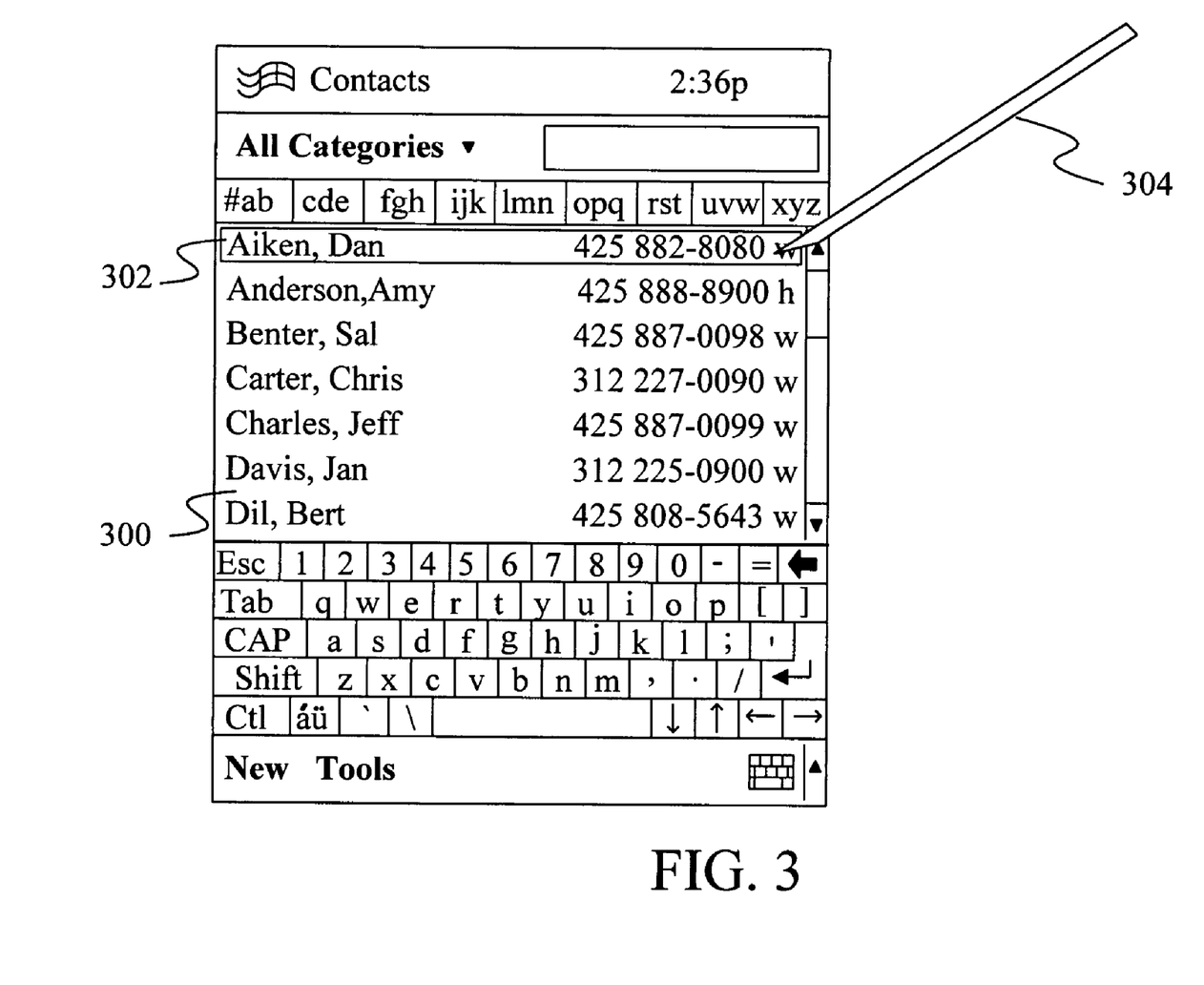
FIG. 3 is a screen shot of a display produced by a contacts application.

FIG. 3 shows an image of a display generated by a contacts application. The display includes a contacts list 300 consisting of a set of entries, such as entry 302. In FIG. 3, a user has placed a stylus 304 on entry 302 and is holding the stylus in place. Under some embodiments of the invention, this tap-and-hold gesture is considered to be a context menu gesture. In response to the gesture, software of the present invention notifies the contacts application that a context menu gesture has been detected.

Figure 4:
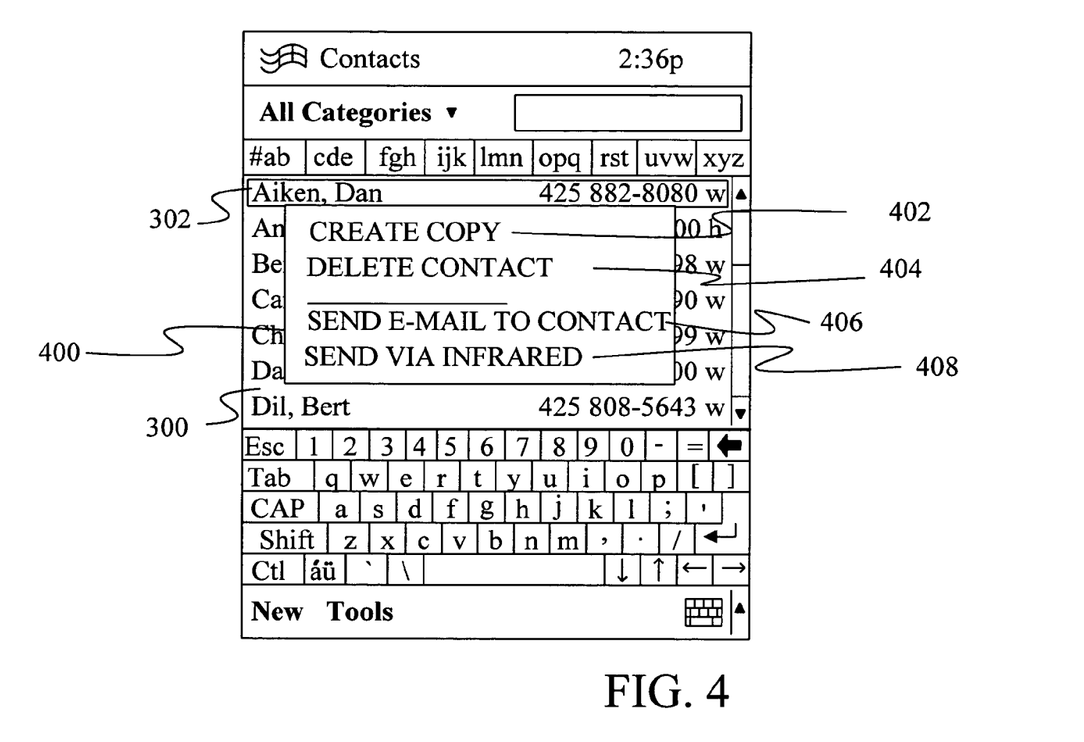
FIG. 4 is a screen shot of a display produced by a contacts application with a context menu of the present invention.

When it receives the notification that the context menu gesture has been detected, the contacts application displays a context menu 400 as shown in FIG. 4. Context menu 400 includes four commands 402, 404, 406, and 408. The exact contents and location of the context menu is determined by the parent application and different commands and context menu locations may be used within the scope of the present invention.

Figure 5:
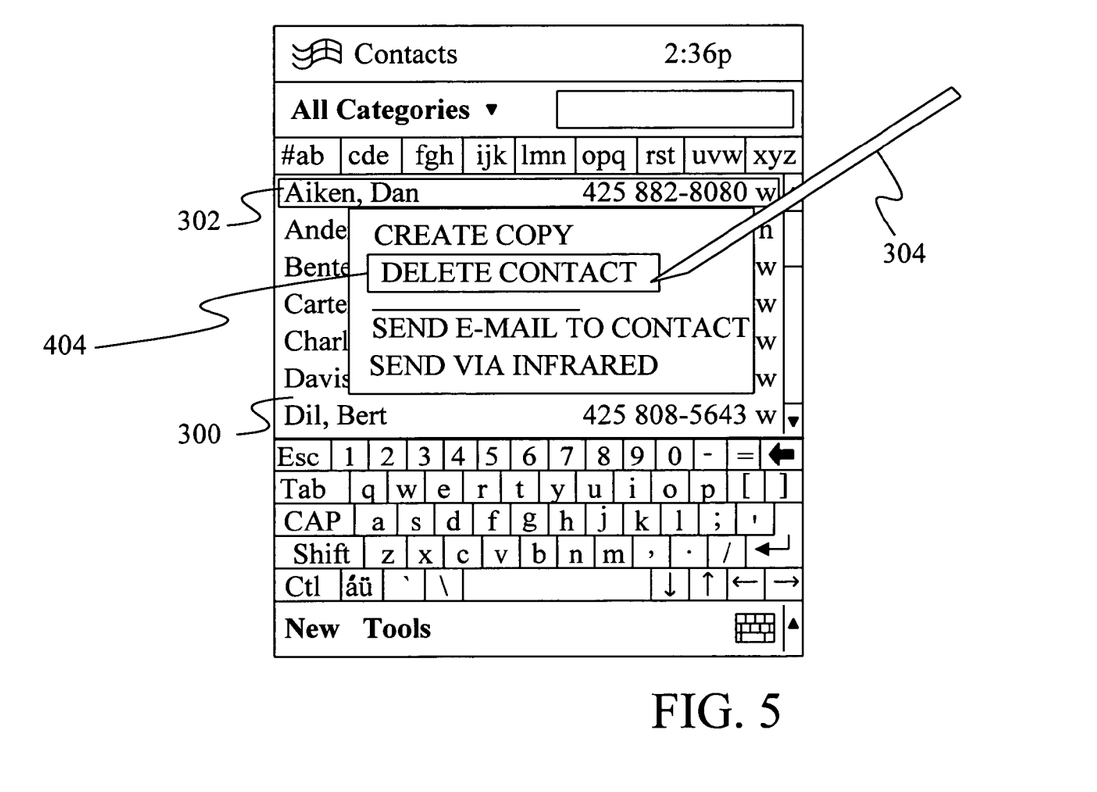
FIG. 5 is a screen shot of a display showing the selection of a command in the context menu of FIG. 4.
Figure 6:
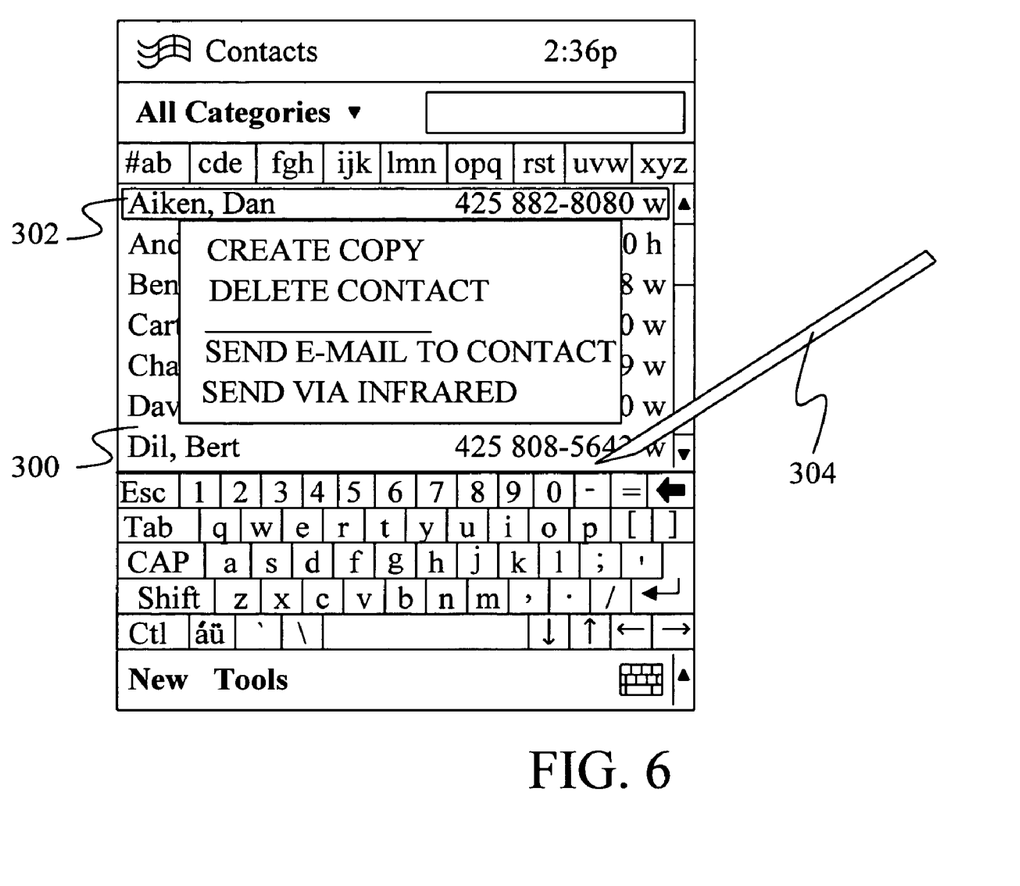
FIG. 6 is a screen shot of a display showing a stylus touch outside of a context menu to close the context menu without selecting a command.

Once the context menu is displayed, the user may select one of the displayed commands by tapping the command with the stylus 304 or by rotating the side action button and activating the button when the desired command is highlighted. FIG. 5 shows such a selection where the user has tapped on command 404. If the user wishes to dismiss the context menu without making a selection, they may tap stylus 304 outside of the context menu as shown in FIG. 6.

Figure 7:
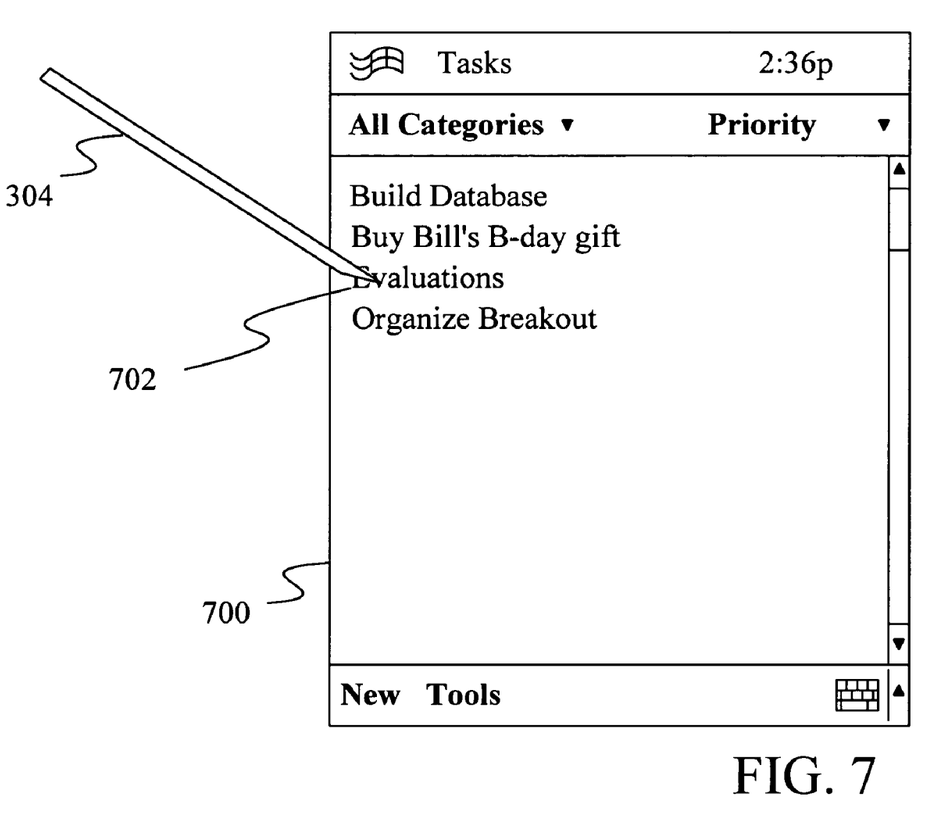
FIG. 7 is a screen shot of a display produced by a tasks application.
Figure 8:
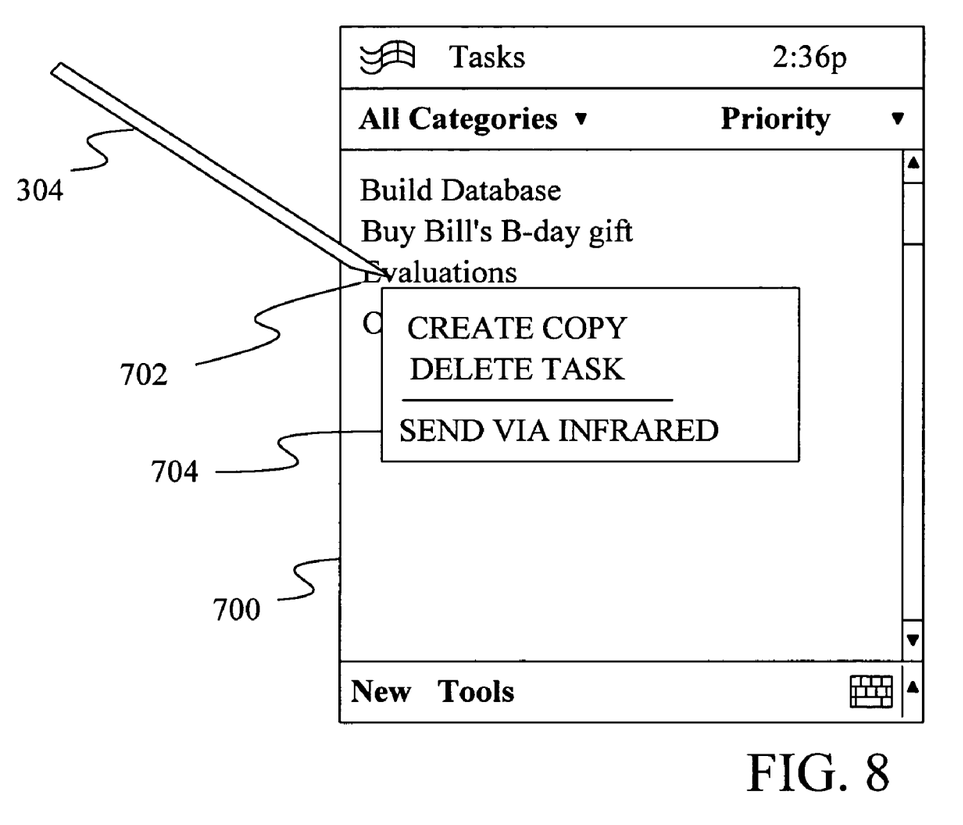
FIG. 8 is a screen shot showing a context menu of the present invention in conjunction with the task display of FIG. 7.

As mentioned above, different parent applications will generate different context menus. For example, FIG. 7 shows a display produced by a Tasks application showing a list of tasks 700. When the user performs the context menu gesture on entry 702, the present invention notifies the Tasks application of the context menu gesture event. In response, the Tasks application generates context menu 704 as shown in FIG. 8.

Under one embodiment of the invention, a user can apply a context menu command to multiple entries. To do this, the user first selects the entries that are to be affected. Under one embodiment, this is done by pressing and holding the action key and tapping each desired entry. Once the entries have been selected, a context menu gesture is performed. For example, the tap-and-hold gesture may be performed on one of the selected entries. The user then selects the command to be applied to the entries from the displayed context menu.

Figure 9:
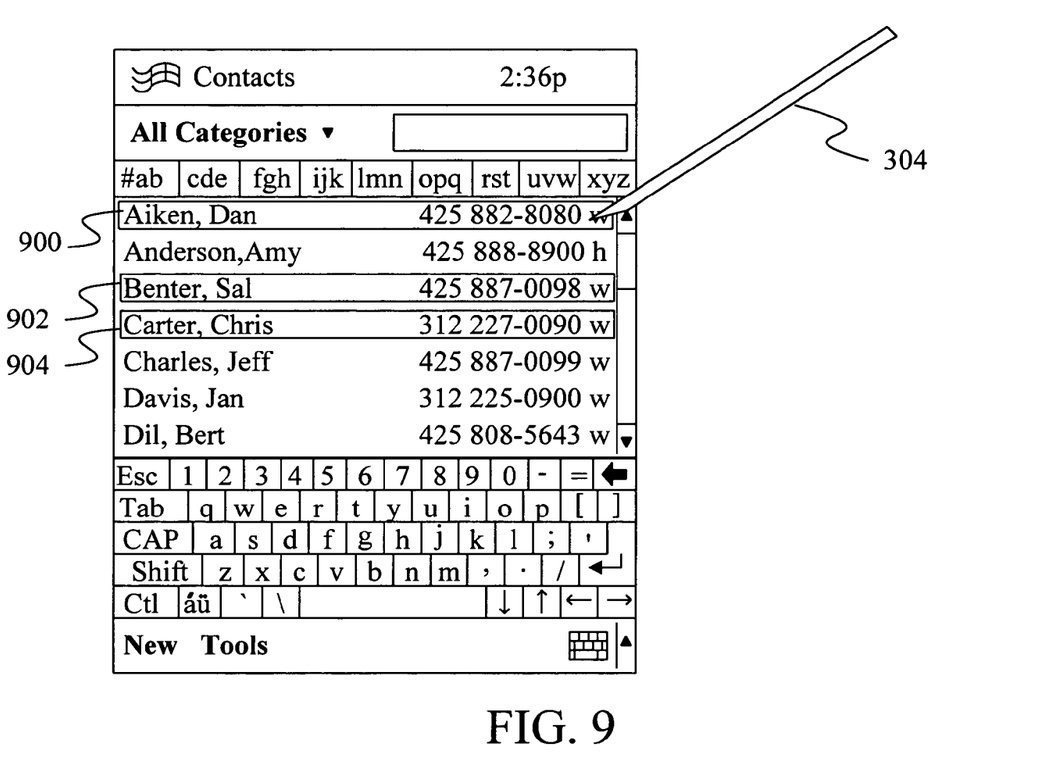
FIG. 9 is a screen shot of a list of contacts entries with multiple entries selected by the user.
Figure 10:
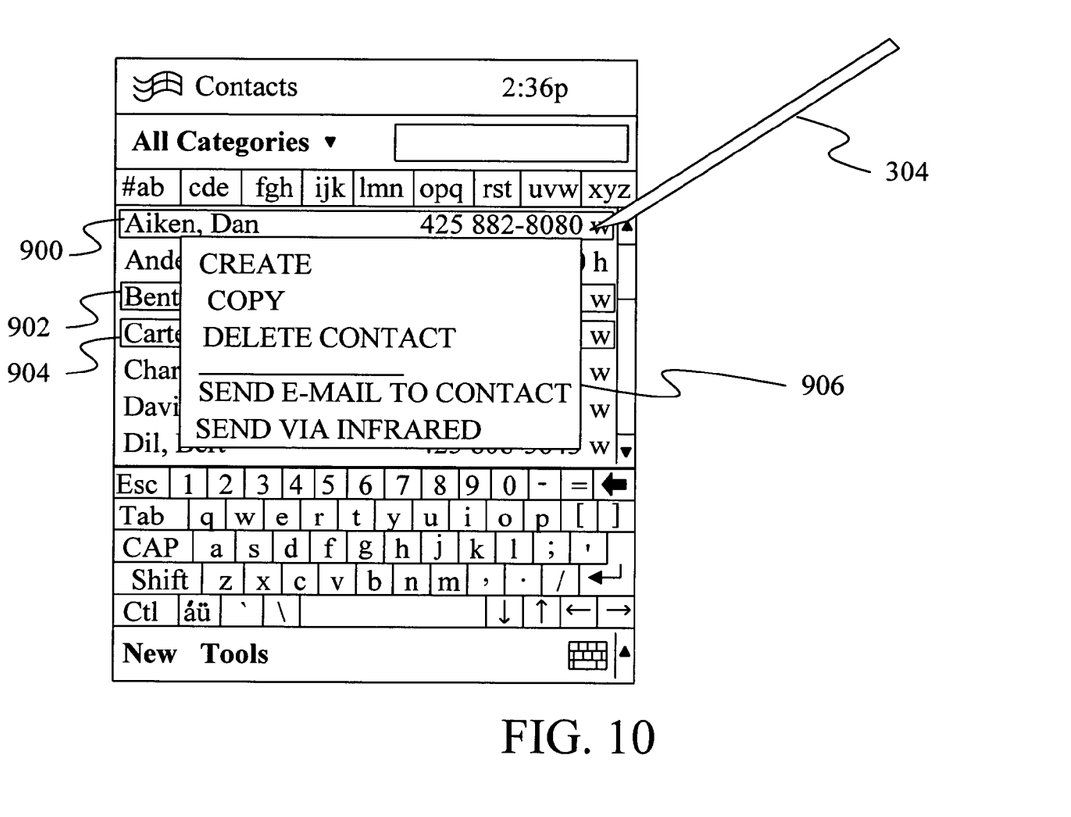
FIG. 10 is a screen shot showing a context menu for the multiple entries selected in FIG. 9.

FIG. 9 provides an example of a display showing multiple entries 900, 902, and 904 highlighted and FIG. 10 shows a resulting context menu 906 that is displayed for the highlighted entries in response to a context menu gesture.

One advantage of using input gestures to trigger context menus under the present invention is that the screen of the hand-held device is not cluttered with menu-triggering icons. In the prior art, such icons were added to the screen to allow users to access context menus. However, in hand-held devices, screen real estate is at a premium and the inclusion of additional icons on the screen causes a reduction in the amount of information or the clarity of the information that can be provided to the user.

Figure 11:
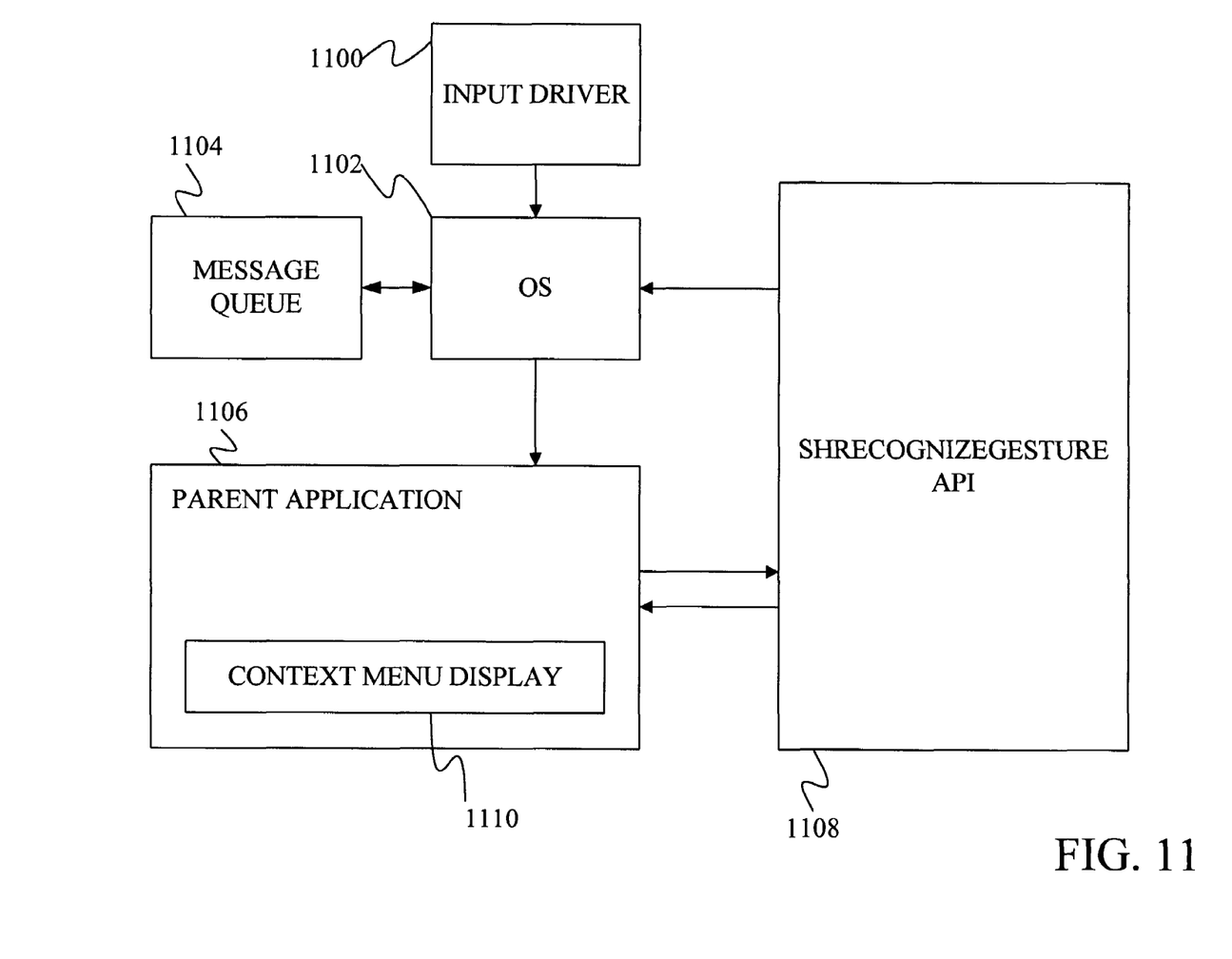
FIG. 11 is a block diagram of software components under one embodiment of the present invention.

FIG. 11 provides a block diagram of computer software components that form part of the present invention. In FIG. 11, input drivers 1100 receive input from a user and convert the input into one or more input messages. These input messages are passed to an operation system 1102, which places the messages in a queue 1104 according to the order in which they are received. Operating system 1102 then reads the top message in the queue and passes the input message to the application responsible for the currently displayed window. In FIG. 11, operating system 1102 passes the input message to parent application 1106.

When it receives the input message, application 1106 calls an application programming interface 1108 named SHRecognizeGesture. SHRecognizeGesture 1108 determines if this input is part of a context menu gesture.

If the input message completes a context menu gesture, SHRecognizeGesture notifies parent application 1106 that a context menu gesture was received and the location of the stylus, if appropriate. Parent application 1106 then decides if it will display a context menu for the current location of the stylus. If a context menu is to be displayed, a context menu display component 1110 is activated. Otherwise, nothing is displayed.

Figure 12:
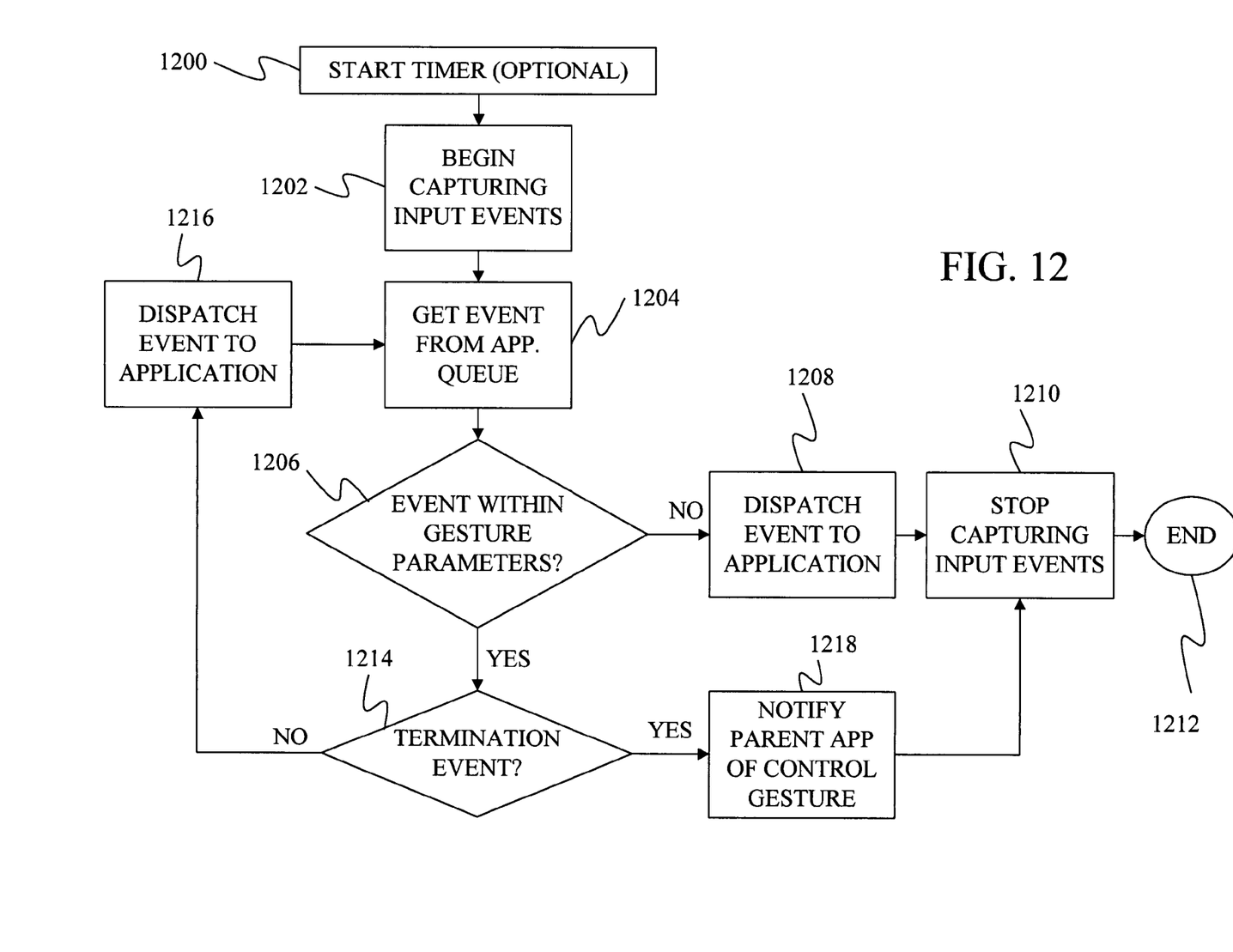
FIG. 12 is a flow diagram for recognizing a context menu gesture under one embodiment of the present invention.

FIG. 12 shows a flow diagram of a method implemented by SHRecognizeGesture 1108 to determine if a context menu gesture has occurred. At step 1200, the method starts a timer that will generate a termination event after a specified period of time. For example, if the stylus must be held in place for a period of time to produce the context menu gesture, the timer will indicate when that period of time has passed.

After the timer has been set, SHRecognizeGesture 1108 issues a command to the operating system to capture input events at a step 1202. This prevents the input event messages from being routed directly to the parent application. At step 1204, the method accesses the event queue and retrieves the top-most event.

At step 1206, the method checks to see if this event is within the parameters of the gesture.

The parameters of the context menu gesture can be passed to the gesture recognition API by the parent application or can be stored in memory and retrieved by the API. The parameters can be the same at all locations on the screen or can be different at different locations. For example, with a tap-and-hold gesture, one parameter of the gesture is the distance the stylus can move during the holding portion of the gesture. This distance can be defined by a single sized contact area for all locations on the screen or it can have different definitions at different locations on the screen. For example, the contact area can be small in an edit control box and large over an entry in a list view area.

Figures 13, 14:
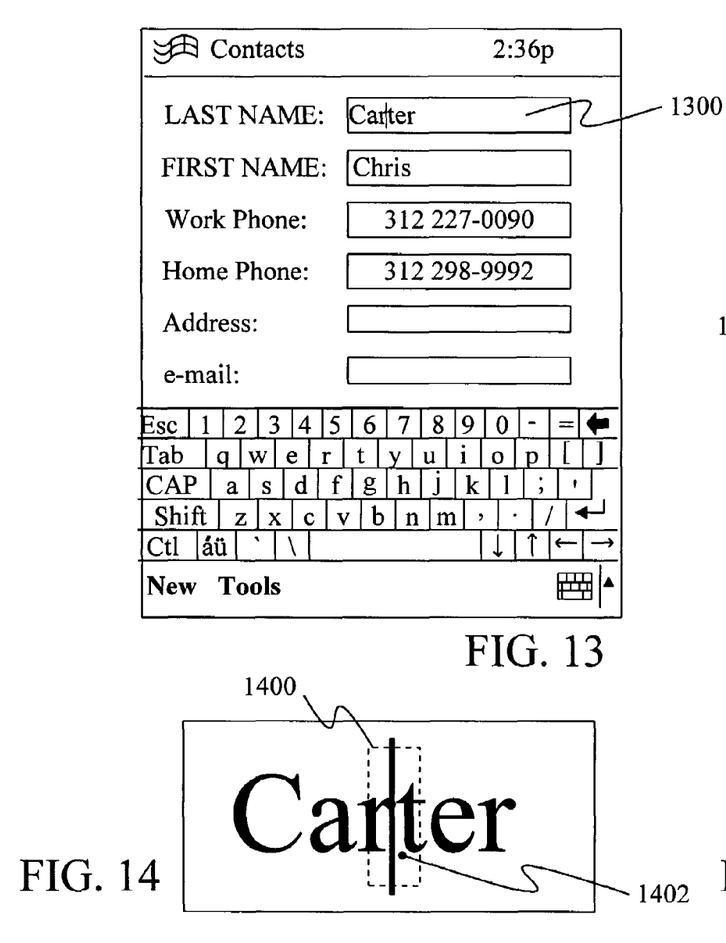
FIG. 13 is a screen shot of a display showing an edit control.
FIG. 14 is a magnified view of the edit control of FIG. 13 showing a contact area.
Figure 15:
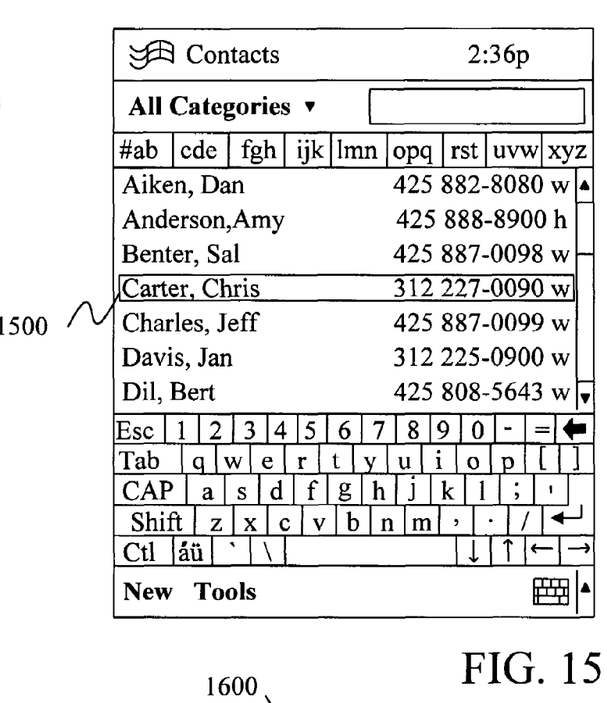
FIG. 15 is a screen shot of a display showing a list of entries.
Figure 16:
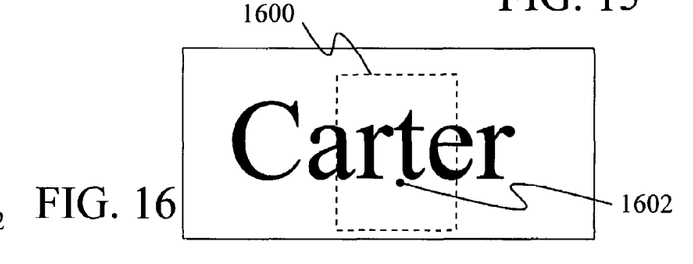
FIG. 16 is a magnified view of an entry of FIG. 15 showing a contact area.

Examples of different contact areas are shown in FIGS. 13, 14, 15, and 16. FIG. 13 shows a display having an edit control 1300 in which the user performs a tap-and-hold gesture. FIG. 14 shows a magnified view of edit control 1300. In FIG. 14, a contact area 1400 in which the user must hold the stylus to produce a context menu gesture is shown around a contact point 1402, where the user initially tapped the stylus. FIG. 15 shows a display having a list of entries including entry 1500. FIG. 16 shows a magnified view of entry 1500 together with a contact area 1600 in which the user must hold the stylus to produce a context menu gesture. Contact area 1600 is around contact point 1602 where the user initially tapped the stylus on entry 1500.

Note that contact area 1400 of FIG. 14 is smaller than contact area 1600 of FIG. 16. As such, a smaller movement is needed in edit control 1300 to violate the context menu gesture parameters than in entry 1500. The larger contact area in entry 1500 makes it easier for users to activate a context menu while they are moving while the smaller contact area in edit control 1300 allows the system to detect small non-context menu gestures in areas where the user is likely to perform such gestures. For example, the small contact area in edit control 1300 allows the system to detect a drag operation earlier.

In some embodiments, the size of the contact area is dynamic and changes based on the font of the text near the initial contact point. In some embodiments, the contact area is simply set to the double-click width, which is the maximum distance that two taps can be separated and still be considered a double-click gesture. Under some embodiments, the length of time that the stylus must remain in the contact area also changes depending on the initial location of the stylus.

If this event does not fall within the parameters of an initiated gesture at step 1206 of FIG. 12, the event is dispatched to the parent application at step 1208 for further processing by the parent application. SHRecognizeGesture 1108 then issues a command to the operating system to stop capturing input events at a step 1210 before the method ends at step 1212.

If this event is within the parameters of the gesture, the event is examined to see if it terminates the gesture at step 1214. If the event does not terminate the gesture at step 1214, the event is dispatched to the parent application for further processing at step 1216. The method then returns to step 1204 and retrieves the next input event from the event queue.

If the event terminates the gesture at step 1214, the parent application is notified that a context menu gesture was detected at step 1218. SHRecognizeGesture 1108 then issues a command to the operating system to stop capturing input events at step 1210 before the method ends at step 1212.

Through the steps described above, the method of FIG. 12 is able to detect context menu gestures such as the tap-and-hold gesture. The first input event in a tap-and-hold gesture is a stylus down event. This event generates an event message indicating that the stylus is down at a particular location on the screen. After receiving this event message, the application calls SHRecognizeGesture 1108 to determine if the user is making a context menu gesture.

When it is called, SHRecognizeGesture 1108 starts a timer at step 1200 that indicates how long the stylus must remain in the contact area for a valid context menu gesture. SHRecognizeGesture 1108 then starts capturing input events at step 1210 As the user holds the stylus on the screen, the stylus may move slightly across the screen. This movement causes a stylus move event message to be posted to the queue. At step 1206, the move event is examined to see if it is within the parameters of the context menu gesture. Specifically, the move event is examined to determine if the stylus has moved outside of the contact area. If the stylus has moved outside the contact area, the user is probably trying to perform a drag operation and not a context menu gesture. If this is the case, the move event is dispatched to the application at step 1208 and SHRecognizeGesture 1108 stops capturing event messages at step 1210.

If the stylus move event is within the gesture parameters, it is checked at step 1214 to determine if it is a termination event. Since the tap-and-hold gesture is only terminated after the stylus has been on the screen for a period of time, the stylus move event is not a termination event. Therefore, the move event dispatched to the parent application at step 1216 and the process returns to step 1204 to retrieve the next input message from the queue.

The user may also lift the stylus before the context menu gesture is complete. This results in a stylus up event message, which is not within the parameters for a tap-and-hold gesture at step 1206. As such, the stylus up event means that the user is not performing a tap-and-hold. Since a tap-and-hold is not being performed, the event is dispatched to the parent application at step 1208 and the method ends at step 1212.

Eventually, a time event is generated by the timer started at step 1200. This event is within the parameters of the tap-and-hold gesture at step 1206. In fact, the timer event is the termination event for the tap-and-hold gesture. As such, after step 1214 of FIG. 12, the parent application is notified that a context menu gesture has been detected at step 1218.

In one embodiment, the context menu gesture is formed by pressing and holding an external button on the pen-based device for a period of time. For example, in one embodiment, the context menu gesture involves pressing and holding action button 90 of FIG. 2. This context menu gesture provides two benefits. First, it allows the user to open a context menu while manipulating the input device with only one hand. Thus, a user can use context menus under this embodiment even if one of their hands is engaged in another activity (holding a briefcase, for example). The second benefit of this context gesture is that it allows the user to invoke context menus for displayed objects that cannot be easily selected using a stylus. For instance it is difficult to select the border of a window with a stylus. For example, in the case of an email message, the stylus will always land on the text of the message or the header and never on the border surrounding the window.

However, by using the action button to perform the context menu gesture, a user can invoke a context menu for the border of a window. In some embodiments, before performing the context menu gesture, the user first selects the window border by rotating the action button until the border is highlighted. In other embodiments, the context menu gesture is automatically applied to the window border when the selection is of zero width or is just a caret.

In some applications, context menus are also provided in edit fields. These context menus can provide many well-known commands such as cut, copy, and paste.

Although tap-and-hold and holding the action button have been described as possible context menu gestures, other movements can be used in their place. In particular, double-tapping or pressing and holding the Action button while tapping on an item may be used as context menu gestures.

Although the present invention has been described with reference to particular embodiments, workers skilled in the art will recognize that changes may be made in form and detail without departing from the spirit and scope of the invention.

What is claimed is:

1. A computer-readable medium for a hand-held device, the device capable of being held with one hand and having a button that is capable of being rotated by and actuated by the hand holding the device, the computer-readable medium having computer-executable instructions for performing steps comprising:

receiving an indication that a user has rotated the button;

highlighting a window border in response to the rotation of the button;

receiving an indication that a user has depressed the button after highlighting the window border;

determining that the button has been depressed long enough to constitute a context menu gesture; and displaying a context menu on the device in response to the context menu gesture, wherein displaying a context menu comprises:

determining that the window border on the display is highlighted before displaying the context menu; and displaying a context menu comprising at least one command that is specifically relevant to the highlighted window border rather than another area within the window while continuing to display and highlight at least a portion of the window.

2. A method of producing a context menu on a display of a hand-held device, the method comprising:

determining that a user has rotated a button on the hand-held device;

highlighting a window border in response to the user rotating the button;

determining whether a user has manipulated the button on the hand-held device to satisfy a context menu gesture requirement; and displaying a context menu if the context menu gesture requirement has been satisfied, wherein displaying a context menu comprises:

determining that the window border on the display is highlighted before displaying the context menu; and displaying a context menu comprising at least one command that can be applied to the highlighted window border rather than an area within the window while displaying at least part of the highlighted window.

3. The method of claim 2 wherein the context menu gesture requirement comprises pressing the button for more than a required period of time.

4. The method of claim 3 wherein the context menu gesture requirement is not satisfied if the user presses and releases the button before the required period of time.

5. The method of claim 3 further comprising determining that a user has made a selection gesture instead of the context menu gesture.

\* \* \* \* \*